United States Patent
Carino et al.

(10) Patent No.: US 10,362,399 B1
(45) Date of Patent: Jul. 23, 2019

(54) DETECTION OF HEADPHONE ORIENTATION

(71) Applicant: Apple Inc., Cupertino, CA (US)

(72) Inventors: Marc-Angelo P. Carino, Los Angeles, CA (US); Brooke L. Bunney, Mountain View, CA (US); Robert D. Zupke, San Jose, CA (US); Paul S. Van Wieren, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/100,069

(22) Filed: Aug. 9, 2018

Related U.S. Application Data

(60) Provisional application No. 62/562,226, filed on Sep. 22, 2017.

(51) Int. Cl.
| | |
|---|---|
| *H04R 1/10* | (2006.01) |
| *H04R 5/04* | (2006.01) |
| *H04R 29/00* | (2006.01) |
| *H04R 5/033* | (2006.01) |
| *G06F 3/0346* | (2013.01) |

(52) U.S. Cl.
CPC .......... *H04R 5/033* (2013.01); *G06F 3/0346* (2013.01); *H04R 1/1041* (2013.01); *H04R 5/04* (2013.01); *H04R 29/001* (2013.01); *H04R 1/1091* (2013.01); *H04R 2201/109* (2013.01); *H04R 2460/07* (2013.01)

(58) Field of Classification Search
CPC ........ H04R 5/033; H04R 1/1041; H04R 5/04; H04R 29/001; H04R 1/1091; H04R 2001/109; H04R 2460/07; G06F 3/0346

USPC ........................................................ 381/370
See application file for complete search history.

(56) References Cited

U.S. PATENT DOCUMENTS

| | | |
|---|---|---|
| 9,049,508 B2 | 6/2015 | Puskarich |
| 9,113,246 B2 | 8/2015 | Bastide et al. |
| 9,445,172 B2 | 9/2016 | Pong et al. |
| 9,538,302 B2 | 1/2017 | Turgul |
| 2010/0058251 A1 | 3/2010 | Rottler et al. |
| 2012/0114132 A1* | 5/2012 | Abrahamsson ...... H04R 1/1016 381/74 |
| 2013/0279724 A1 | 10/2013 | Stafford et al. |
| 2014/0086438 A1* | 3/2014 | Tachibana ............ H04R 29/001 381/309 |
| 2014/0254817 A1* | 9/2014 | Vilermo ................... H04R 1/32 381/74 |

(Continued)

*Primary Examiner* — Sean H Nguyen
(74) *Attorney, Agent, or Firm* — Kilpatrick Townsend & Stockton LLP

(57) ABSTRACT

Some embodiments of the disclosure provide systems and methods of detecting headphone orientation. The systems and methods described herein may be used, for example, to determine which ear cup of a pair of headphones is positioned on which ear of a user. By making this determination, stereophonic audio signals may be divided into their left audio channel signal and right audio channel signal components and transmitted to the proper ear cup. In another example, the systems and methods described herein may be used to determine when a pair of headphones are being worn on a user's head and/or are removed from a user's head. By determining when the headphones are being worn, the headphones may be able to automatically pause an audio signal and/or power off when a transition from on-head to off-head is detected.

20 Claims, 8 Drawing Sheets

(56) References Cited

U.S. PATENT DOCUMENTS

| | | |
|---|---|---|
| 2016/0198251 A1* | 7/2016 | Pan ..................... H04R 1/1041 381/74 |
| 2016/0216943 A1 | 7/2016 | Welti et al. |
| 2017/0026735 A1 | 1/2017 | Li et al. |
| 2017/0094411 A1* | 3/2017 | Peterson ................ H04R 5/033 |

* cited by examiner

DETECTION OF HEADPHONE ORIENTATION

CROSS-REFERENCES TO RELATED APPLICATIONS

This application claims the benefit of U.S. Provisional Application No. 62/562,226, filed Sep. 22, 2017, entitled "Detection of Headphone Orientation." The disclosure of this application is incorporated by reference herein in its entirety.

FIELD

The present disclosure relates generally to headphones, and more specifically, to systems and methods for detecting headphone orientation.

BACKGROUND

Headphones may be used to transport an audio signal from a source device (e.g., a mobile device, an MP3 player, etc.) to a user's ears. In some instances, the audio signal may be stereophonic in that it is composed of a left audio channel signal intended for a user's left ear and a right audio channel signal intended for a user's right ear. The left audio channel signal may be different than the right audio channel signal, but may be played in synchronization to allow the user to fully experience the audio signal. To address stereophonic audio signals, headphones are typically asymmetric in that they have assigned left and right ear cups configured to be worn on the left and right ears, respectively.

SUMMARY

In an ecosystem of electronic products, it may be beneficial for an accessory device to be symmetric in that it may be worn or used in a plurality of configurations. For example, a pair of headphones may be manufactured without predefined left and right ear cups. However, this may result in a left audio channel signal being erroneously played to a right ear and a right audio channel signal being erroneously played to a left ear. To avoid this, unassigned left and right ear cups may only be able to play the same monophonic audio signal to both the left ear and the right ear, and may not be able to support stereophonic audio signals. This may not be desirable, as stereophonic signals may be considered more advanced in that they are capable of creating or mimicking multi-directional sound.

Thus, some embodiments of the disclosure provide systems and methods of detecting headphone orientation. The systems and methods described herein may be used, for example, to determine which ear cup of a pair of headphones is positioned on which ear of a user. By making this determination, stereophonic audio signals may be divided into their left audio channel signal and right audio channel signal components and transmitted to the proper ear cup. In another example, the systems and methods described herein may be used to determine when a pair of headphones are being worn on a user's head and/or are removed from a user's head. By determining when the headphones are being worn, the headphones may be able to automatically pause an audio signal and/or power off when a transition from on-head to off-head is detected.

Some embodiments of the disclosure pertain to a pair of headphones. The pair of headphones comprises a first ear cup. The first ear cup includes a first speaker and a first set of sensors configured to generate a first set of measurements. The first set of measurements includes a direction of a gravitational field and a direction of magnetic north with respect to the first ear cup. The pair of headphones further comprises a second ear cup. The second ear cup includes a second speaker and a second set of sensors configured to generate a second set of measurements. The second set of measurements includes a direction of the gravitational field and a direction of magnetic north with respect to the second ear cup. The pair of headphones further comprises a headband extending between the first and second ear cups. The pair of headphones further comprises control circuitry coupled to the first and second sets of sensors and configured to determine a relative orientation between the first and second ear cups based on the first and second sets of measurements and use the relative orientation in determining which speaker receives a left channel audio signal and which speaker receives a right channel audio signal.

In some embodiments, each of the first and second sets of sensors includes an accelerometer configured to measure a direction of a gravitational field and a magnetometer configured to measure a direction of magnetic north. In some embodiments, each magnetometer measures vector components of a magnetic field. In some embodiments, the headphones may further include a strain gauge operatively coupled to detect when the first and second ear cups are separated by more than a predetermined distance.

Some embodiments of the disclosure pertain to a pair of headphones. The pair of headphones comprises a first ear cup. The first ear cup includes a first speaker, a first accelerometer configured to measure a direction of a gravitational field, and a first magnetometer configured to measure a direction of magnetic north with respect to the first ear cup. The pair of headphones further comprises a second ear cup. The second ear cup includes a second speaker, a second accelerometer configured to measure a direction of the gravitational field, and a second magnetometer configured to measure a direction of magnetic north with respect to the second ear cup. The pair of headphones further comprises a headband extending between the first and second ear cups. The pair of headphones further comprises control circuitry coupled to receive input from the first and second accelerometers and the first and second magnetometers, determine a relative orientation between the first and second ear cups based on the input, and use the relative orientation to select which ear cup receives a left channel audio signal and which ear cup receives a right channel audio signal.

In some embodiments, the control circuitry may further determine a first angle based on input from the first accelerometer and the first magnetometer, determine a second angle based on input from the second accelerometer and the second magnetometer, and compare the first angle to the second angle to determine the relative orientation between the first and second ear cups. In some embodiments, each magnetometer measures vector components of a magnetic field. In some embodiments, the pair of headphones further comprises a strain gauge operatively coupled to detect when the first and second ear cups are separated by more than a predetermined distance.

A pair of headphones according to some embodiments can include first and second ear cups and a headband extending between the first and second ear cups. The first ear cup can include a first speaker, a first accelerometer configured to measure a direction of the gravitational field with respect to the first ear cup, and a first magnetometer configured to measure a direction of magnetic north with respect to the first ear cup. The second ear cup can include a second speaker, a second accelerometer configured to measure a direction of the gravitational field with respect to the second ear cup, and a second magnetometer configured to measure a direction of magnetic north with respect to the second ear cup. The headphones can further include wireless communication circuitry configured to receive media content, including a stereophonic audio signal that includes a left channel audio signal and a right channel audio signal, from an external source and control circuitry. The control circuitry can be coupled to receive input from the first and second accelerometers and the first and second magnetometers and determine a relative orientation between the first and second ear cups based on the input and use the relative orientation in selecting which of the first or second speakers to route the left channel audio signal and which of the first or second speakers to route the right audio channel signal.

To better understand the nature and advantages of embodiments of the present disclosure, reference should be made to the following description and the accompanying figures. It is to be understood, however, that each of the figures is provided for the purpose of illustration only and is not intended as a definition of the limits of the scope of embodiments of the present disclosure. Also, as a general rule, and unless it is evident to the contrary from the description, where elements in different figures use identical reference numbers, the elements are generally either identical or at least similar in function or purpose.

DETAILED DESCRIPTION

Figure 1:
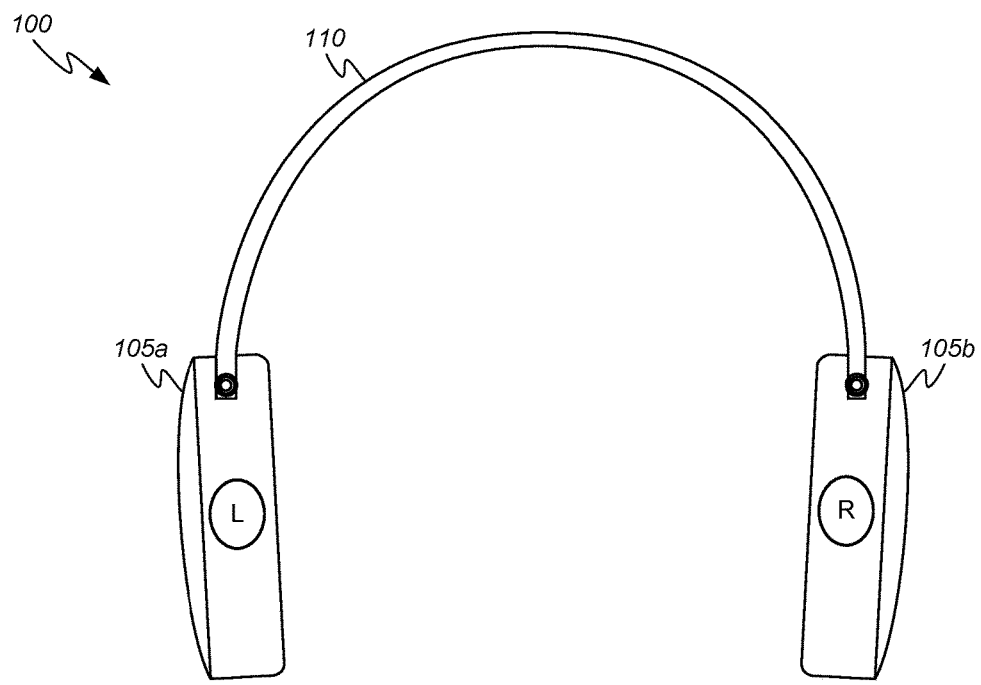
FIG. 1 shows a front view of an asymmetric pair of headphones.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Reference is now made to FIG. 1, which depicts a front view of an asymmetric pair of headphones 100. The headphones 100 may include a left ear cup 105a and a right ear cup 105b, interconnected by a headband 110. Each ear cup 105a, 105b may include a speaker. The left ear cup 105a may be designated to be worn on the left ear of a user, such as by using a symbol like "L". The right ear cup 105b may be designated to be worn on the right ear of a user, such as by using a symbol like "R". The left and right designations of the ear cups 105a, 105b may be required in asymmetric headphones 100 in order to properly route a left channel audio signal to the left ear of the user and a right channel audio signal to the right ear of the user when the audio signal is stereophonic (i.e., has a signal component intended to be heard by a left ear and a signal component intended to be heard by a right ear). The left audio channel signal may be different than the right audio channel signal, but may be played in synchronization to allow the user to fully experience the audio signal. For example, the left audio channel signal and the right channel audio signal may together provide or mimic directionality of the audio signal.

However, it may be beneficial for the pair of headphones to instead be symmetric (i.e., having interchangeable or unassigned ear cups). Symmetric headphones may provide for increased ease-of-use by users in that they can wear the headphones in any orientation, without regard to which ear cup is worn on which ear. Some embodiments of the disclosure provide for symmetric headphones that may automatically detect headphone orientation in order to ascertain to which ear cup to direct a left channel audio signal and to which ear cup to direct a right channel audio signal. By detecting proper orientation, stereophonic audio signals may be properly processed and heard by a user despite the use of symmetric headphones.

Figure 2:
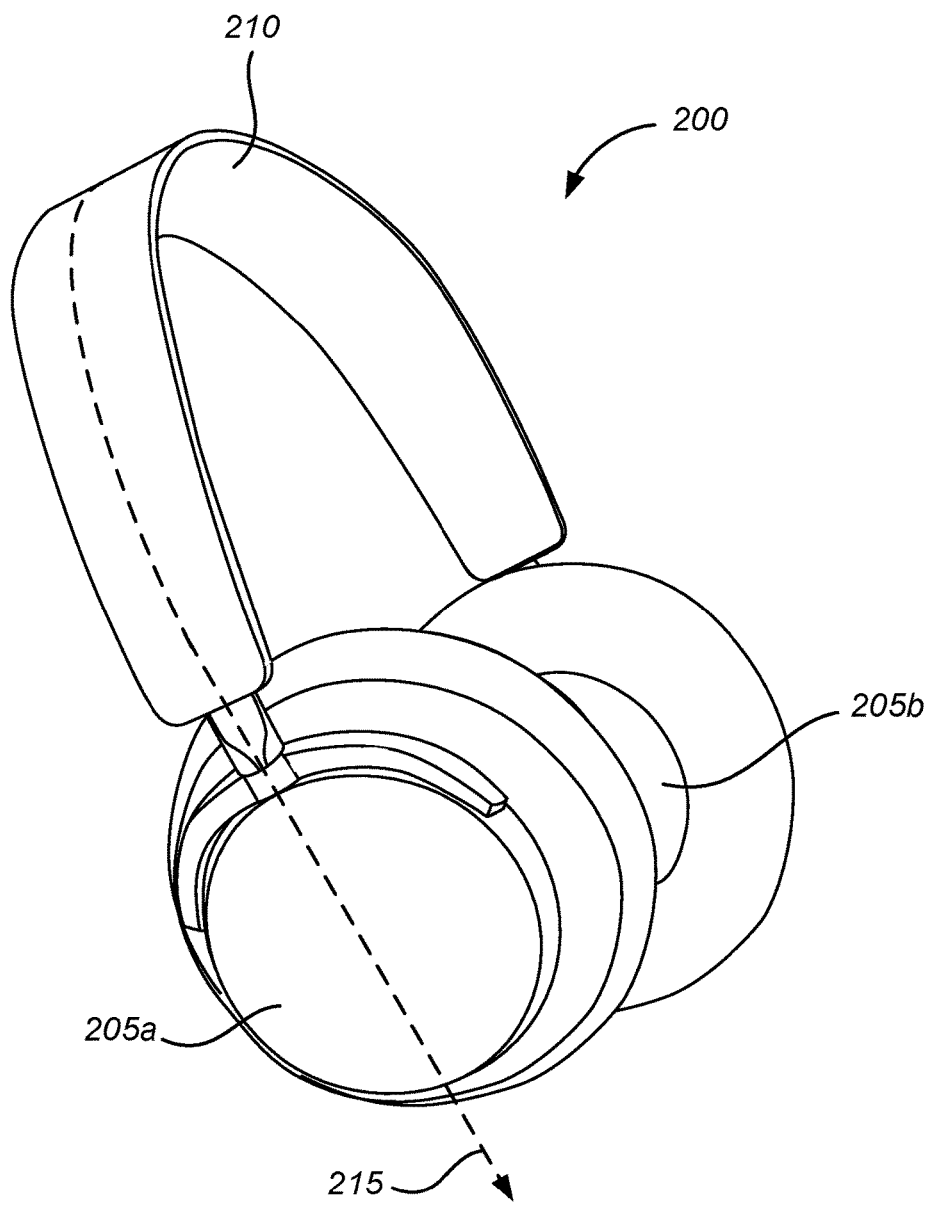
FIG. 2 shows a perspective view of symmetric headphones in accordance with some embodiments of the disclosure.

FIG. 2 shows a perspective view of symmetric headphones 200 in accordance with some embodiments of the disclosure. Headphones 200 may be, for example, over-ear or on-ear headphones 200. Headphones 200 may be include a first ear cup 205a and a second ear cup 205b, interconnected by a headband 210. Each ear cup 205a, 205b may include a speaker. Headphones 200 may be symmetric in that the first ear cup 205a may be worn on either one of the left or right ear of a user, and the second ear cup 205b may be worn on the other of the left or right ear of the user. In some embodiments the symmetric nature of headphones 200 extends to the physical appearance of the ear cups. For example, in some embodiments ear cup 205a is generally indistinguishable from ear cup 205b in both its appearance and in the manner and angle at which the ear cups connect to headband 210. Additionally, in some embodiments headphones 200 are fully symmetric along a centerline 215 that bisects headband 210 and each of ear cups 205a and 205b such that the portions of headphones 200 on each side of centerline 215 (including both portions headband 210 and portions ear cups 205a, 205b) are essentially identical in shape, size and appearance.

Embodiments of the disclosure may nevertheless route a left channel audio signal and a right channel audio signal of a stereophonic audio signal to the proper ear cup by detecting the orientation of the headphones 200, as described further herein. Further, some embodiments described herein may be used to determine when a pair of headphones are being worn on a user's head and/or are removed from a user's head. By determining when the headphones are being worn, the headphones may be able to automatically pause an audio signal and/or power off when a transition from on-head to off-head is detected. For simplicity, various internal components, such as the control circuitry and other components are not shown in FIG. 2.

Figure 3:
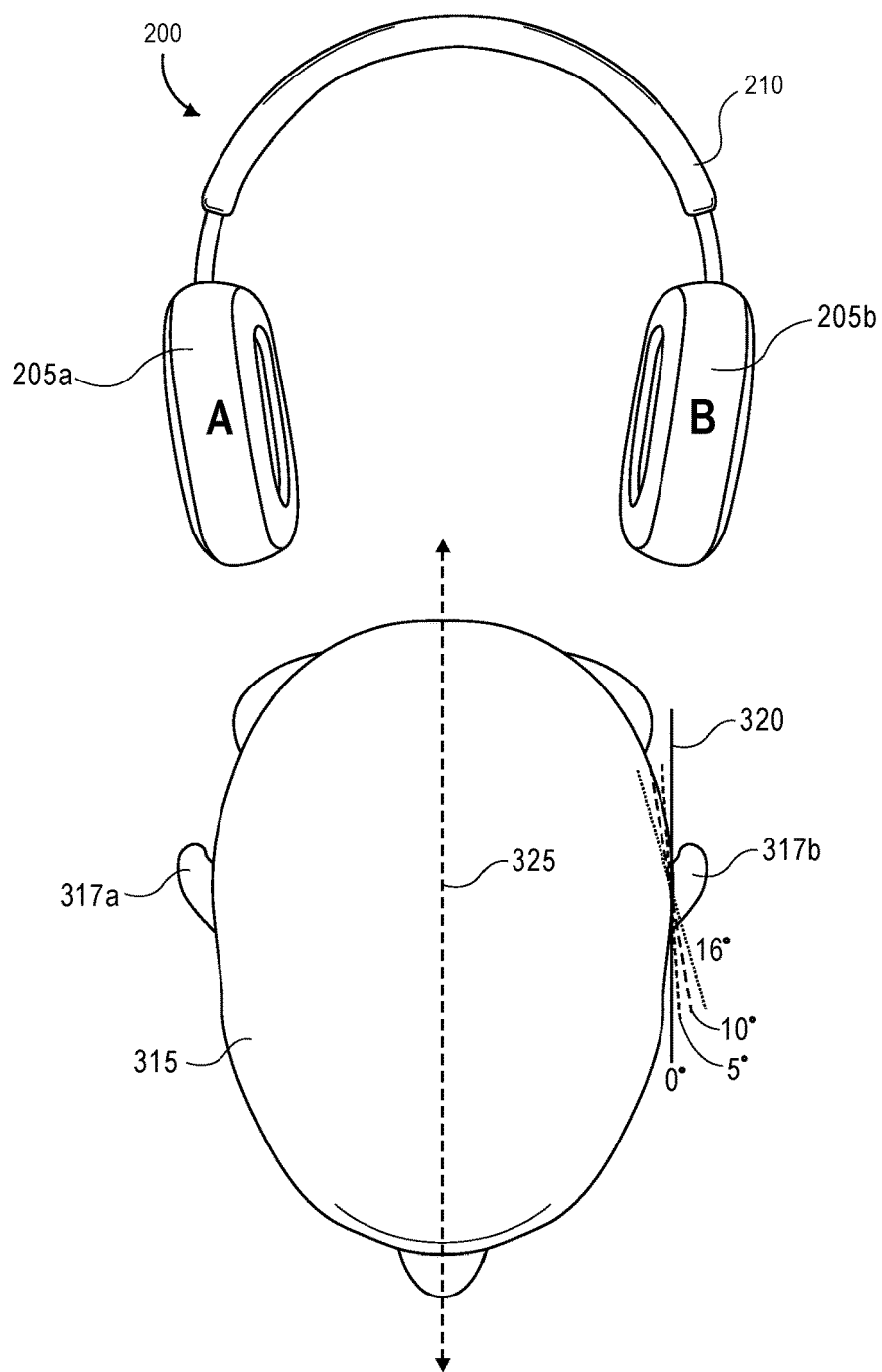
FIG. 3 shows a top view of a pair of headphones that may be worn by a user in a first orientation in accordance with some embodiments of the disclosure.

Reference is now made to FIG. 3, which depicts a top view of a pair of headphones 200 that may be worn by a user in a first orientation in accordance with some embodiments of the disclosure. The headphones may include symmetric ear cups 205a, 205b, interconnected by a headband 210. As shown in FIG. 3, a typical user may have a 5° to 16° tilt at the side of his or her head 315 near each of ears 317a and 317b relative to line 320 which is parallel to a center line 325 through the length of head 315. Thus, according to some embodiments of the disclosure, the pair of headphones 200 may be configured to measure the relative angle of tilt between the ear cups 205a, 205b. This relative angle of tilt may be used to determine which ear cup 205a, 205b is placed over which ear 317a or 317b (i.e., left versus right) and may be used to determine whether the headphones 200 are being worn on the head 315.

For example, head 315 may have a 10° tilt near each ear 317a and 317b. Thus, the relative angle seen by ear cup 205a may be negative 10°, while the relative angle seen by ear cup 205b may be positive 10°. Using these angles, the headphones 200 may be configured to determine that the ear cup 205a is placed over the right ear 317a, while the ear cup 205b is placed over the left ear 317b. Further, the headphones 200 may be configured to determine that the 10° tilt is within the on-head tilt range of 5° to 16°; thus, the headphones 200 may be configured to conclude that the headphones 200 are being worn on a head 315. For example, if the relative angle seen by ear cup 205a is instead 90°, the headphones 200 may be configured to conclude that the headphones 200 are not being worn on a head 315.

Figure 4:
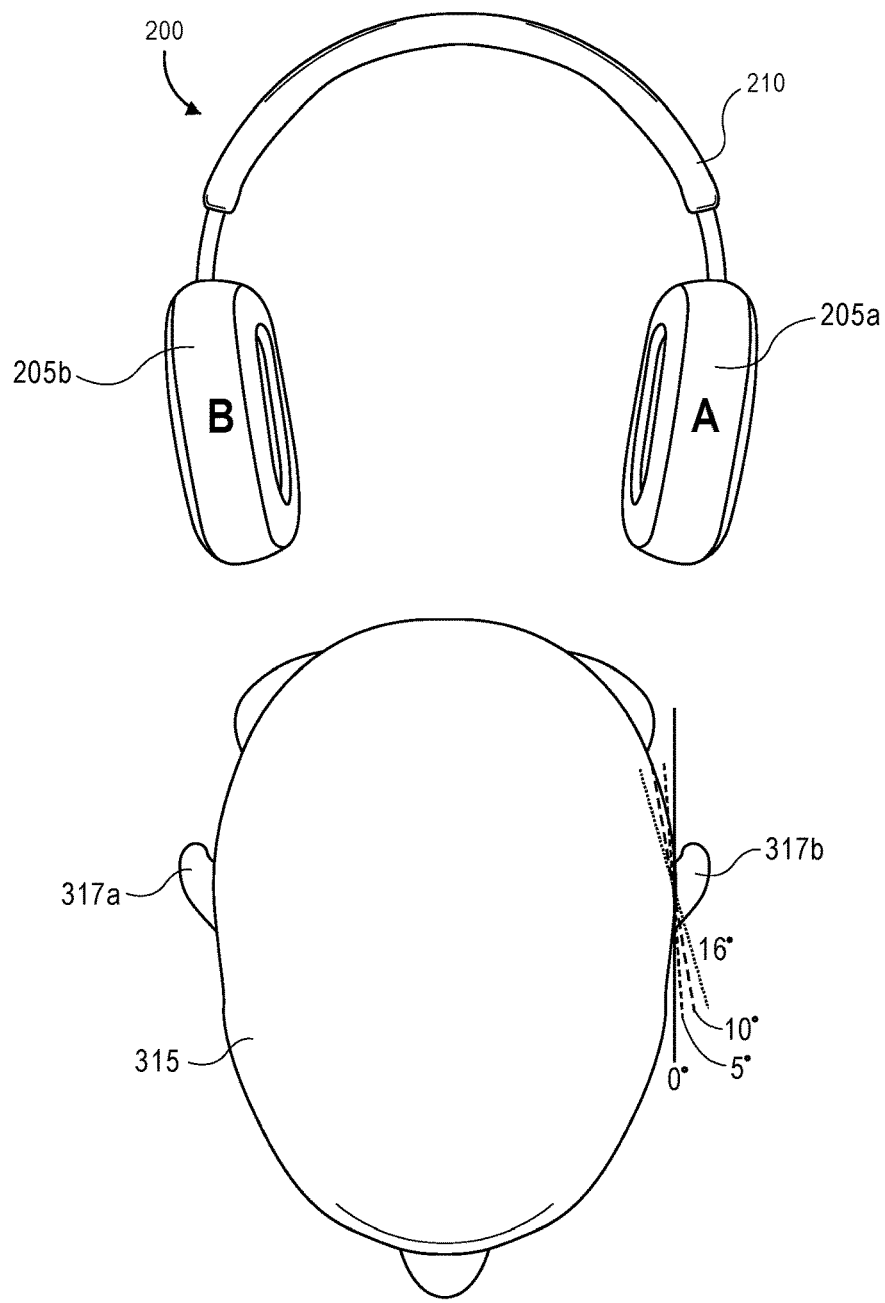
FIG. 4 shows a top view of a pair of headphones that may be worn by a user in a second orientation in accordance with some embodiments of the disclosure.

Reference is now made to FIG. 4, which depicts the same pair of headphones 200 shown in FIG. 3 worn by a user in a second orientation opposite to the first orientation in accordance with some embodiments of the disclosure. In this opposite orientation, the relative angle seen by ear cup 205a may be positive 10°, while the relative angle seen by ear cup 205b may be negative 10°. Using these angles, the headphones 200 may be configured to determine that the ear cup 205a is placed over the left ear 317b, while the ear cup 205b is placed over the right ear 317a. Further, the headphones 200 may be configured to determine that the 10° tilt is within the on-head tilt range of 5° to 16°; thus, the headphones 200 may be configured to conclude that the headphones 200 are being worn on a head 315. For example, if the relative angle seen by ear cup 205a is instead outside the typical on-head tilt range, the headphones 200 may be configured to conclude that the headphones 200 are not being worn on a head 315.

Figure 5:
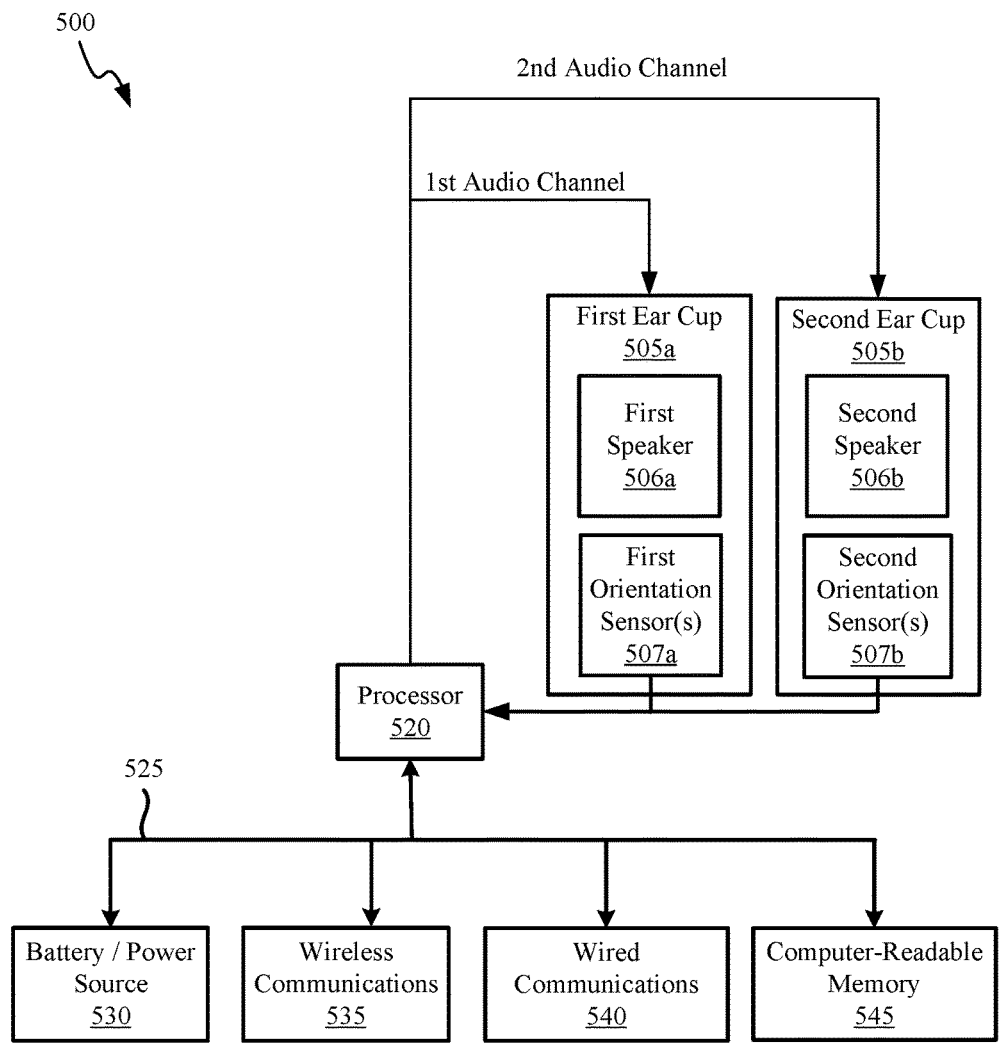
FIG. 5 shows a system level block diagram of a computing device that may be used to implement a pair of headphones in accordance with some embodiments of the disclosure.

FIG. 5 shows a system level block diagram of a computing device 500 that can be used to implement the various components described herein, according to some embodiments. In particular, the detailed view illustrates various components that can be included in headphones 200. As shown in FIG. 5, the computing device 500 can include a processor 520 that represents a microprocessor or controller for controlling the overall operation of computing device 500. The computing device 500 can include first and second ear cups 505a and 505b joined by a headband assembly. The first ear cup 505a may include a first speaker 506a and the second ear cup 505b may include a second speaker 506b for presenting media content to the user. Processor 520 can be configured to transmit first and second audio channel signals (e.g., a left channel audio signal and a right channel audio signal) to first and second ear cups 505a and 505b.

In some embodiments, first orientation sensor(s) 507a can be configured to transmit orientation data of first ear cup 505a to processor 520. Similarly, second orientation sensor(s) 507b can be configured to transmit orientation data of second ear cup 505b to processor 520. Processor 520 can be configured to swap the first audio channel signal with the second audio channel signal in accordance with information received from first and second orientation sensors 507a and 507b. As used herein, processor 520 may also be referred to as "control circuitry".

In some embodiments, the first orientation sensor(s) 507a and/or the second orientation sensor(s) 507b may include one or more of an inertial measurement unit (IMU), an accelerometer, a magnetometer, a gyroscope, a compass, a Hall-effect rotary position sensor, a strain gauge, a magnetic encoder, an imaging sensor, and/or a capacitive sensor. To determine orientation of each ear cup 505a, 505b, a complete six axis orientation may be determined using the sensors 507a, 507b in some embodiments. An accelerometer may be used to measure the direction of the gravitational field (i.e., to determine which way is up and which way is down), and the magnetometer and/or compass may be used to determine the direction of magnetic north. For example, the magnetometer measurement may be used to derive a yaw angle measurement. The magnetometer may output a magnetic field vector (x, y, z) reflecting the magnetic field incident on the magnetometer. This vector may be used to derive a yaw angle measurements.

For a given location, the angle between these two vectors of the accelerometer and the magnetometer may have a constant value. By comparing the vector angles seen at each ear cup 505a, 505b, the processor 520 may determine the relative orientation between each ear cup 505a, 505b. Using these measurements ensures that the relative orientation may be determined regardless of how the headphones are placed relative to a gravitational field.

In some embodiments, other sensors 507a, 507b may be used alternatively or additionally, in some cases to refine or confirm orientations sensed by sensors 507a, 507b. For example, a gyroscope may be used to detect a change in rotation of each ear cup 505a, 505b, and to determine if a change in magnetic field direction is real or induced by a source other than the planet's magnetic field. A strain gauge may detect a headband or ear cup 505a, 505b pushing out from rest to fit a head. A magnetic encoder may detect a cup rotating on its roll or yaw axis. An imaging sensor may detect the ear geometry or presence within the ear cup 505a, 505b. Exemplary imaging sensors include optical sensors, infrared sensors, self-capacitive sensors, mutual capacitive sensors, and/or the like.

A data bus 525 can facilitate data transfer between at least battery/power source 530, wireless communications circuitry 535, wired communications circuitry 540, computer readable memory 545, and processor 520. In some embodiments, processor 520 can be configured to instruct battery/power source 530 in accordance with information received by first and second orientation sensors 507a and 507b. Wireless communications circuitry 535 and/or wired communications circuitry 540 (only one of which is included in some embodiments) can be configured to receive media content from an external source and provide the media content to processor 520. For example, wireless communication circuitry 535 can receive media content over a wireless communication channel such as Bluetooth or WiFi while wired communications circuitry 540 can receive media content over an audio jack (e.g., receptacle connector for a TRS audio plug) a USB connector or a Lightening connector among others. The media content can include a stereophonic audio signal that includes separate left and right channel signals. Processor 520 can then route each of the left and right audio channel signals to one of ear cups 505a or 505b as described herein. In some embodiments, processor 520, wireless communications circuitry 535 and wired communications circuitry 540 can be configured to transmit and receive information from computer-readable memory 545. Computer readable memory 545 can include a single disk or multiple disks (e.g. hard drives) and includes a storage management module that manages one or more partitions within computer readable memory 545.

Figure 6:
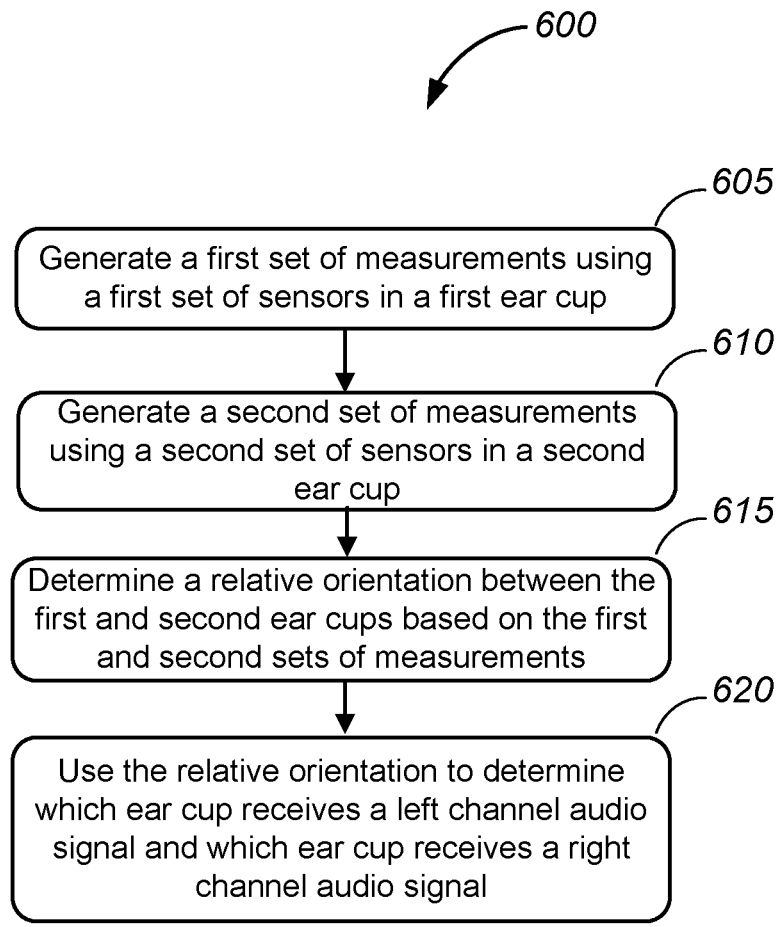
FIG. 6 shows a flowchart of a method for detecting orientation of a pair of headphones in accordance with some embodiments of the disclosure.

Reference is now made to FIG. 6, which depicts a flowchart 600 of a method for detecting orientation of a pair of headphones in accordance with some embodiments of the disclosure. At step 605, a first set of measurements are generated by a first set of sensors in a first ear cup of a pair of headphones. The first set of measurements may include a direction of a gravitational field and a direction of magnetic north with respect to the first ear cup. The first ear cup may further include a first speaker.

At step 610, a second set of measurements are generated by a second set of sensors in a second ear cup of a pair of headphones. The second set of measurements, which in some embodiments is taken concurrently with the first set of measurements in step 605, may include a direction of the gravitational field and a direction of magnetic north with respect to the second ear cup. The second ear cup may further include a second speaker. The first ear cup and the second ear cup may be interconnected by a headband of the headphones. In some embodiments, each of the first and second sets of sensors may include an accelerometer configured to measure a direction of the gravitational field and a magnetometer configured to measure a direction of magnetic north. In some embodiments, the magnetometer may be configured to measure vector components of a magnetic field. In some embodiments, the headphones may further include a strain gauge operatively coupled to the headphones to detect when the first and second ear cups are separated by more than a predetermined distance.

At step 615, a relative orientation between the first and second ear cups may be determined based on the first and second sets of measurements. At step 620, the relative orientation may be used to determine which ear cup receives a left channel audio signal and which ear cup receives a right channel audio signal, i.e., to determine which ear cup processor 520 sends a left audio channel signal and which each ear cup the processor sends a right channel audio signal.

Figure 7:
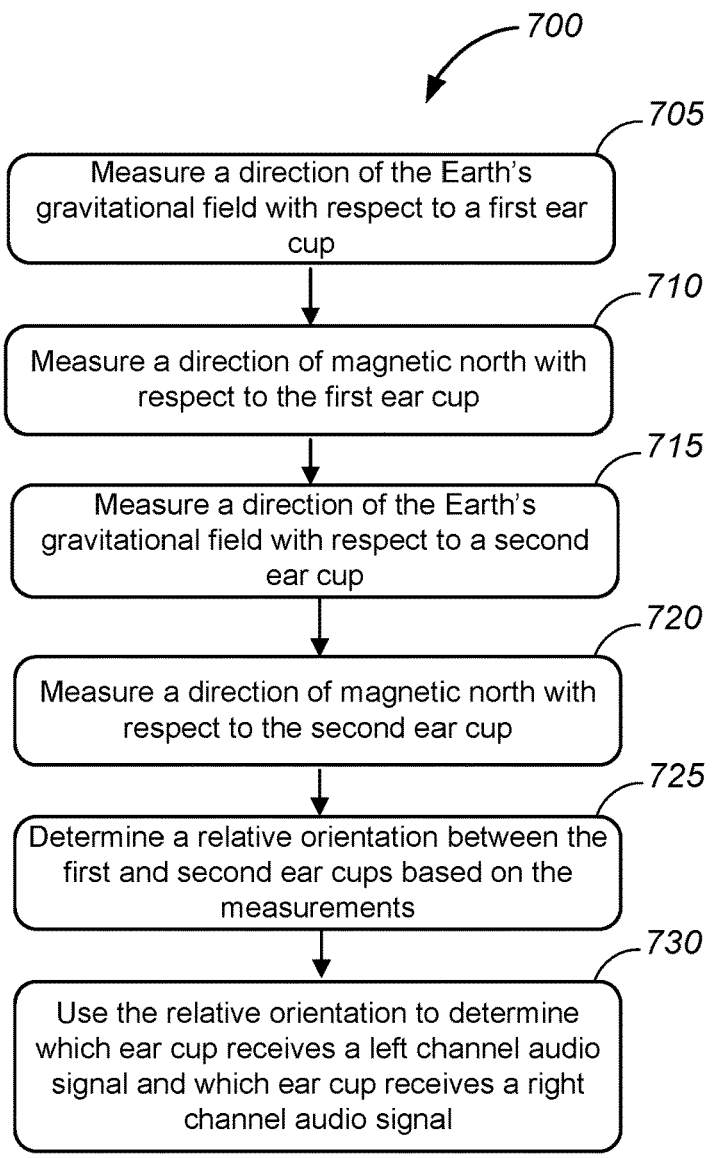
FIG. 7 shows another flowchart of a method for detecting orientation of a pair of headphones in accordance with some embodiments of the disclosure.

Reference is now made to FIG. 7, which depicts another flowchart 700 of a method for detecting orientation of a pair of headphones in accordance with some embodiments of the disclosure. At step 705, a direction of the gravitational field with respect to a first ear cup of a pair of headphones is measured using a first accelerometer of the first ear cup. At step 710, a direction of magnetic north with respect to the first ear cup is measured using a first magnetometer of the first ear cup. The first ear cup may further include a first speaker.

At step 715, a direction of the gravitational field with respect to a second ear cup of the pair of headphones is measured using a second accelerometer of the second ear cup. At step 720, a direction of magnetic north with respect to the second ear cup is measured using a second magnetometer of the second ear cup. The second ear cup may further include a second speaker. The first ear cup may be interconnected with the second ear cup via a headband of the pair of headphones. In some embodiments, each of steps 705, 710, 715 and 720 can be performed concurrently or substantially concurrently.

At step 725, a relative orientation between the first and second ear cups may be determined based on input from the first and second accelerometers and the first and second magnetometers. At step 730, the relative orientation may be used to determine which ear cup receives a left channel audio signal and which ear cup receives a right channel audio signal. In some embodiments, this determination is made by determining a first angle based on input from the first accelerometer and the first magnetometer, determining a second angle based on input from the second accelerometer and the second magnetometer, and comparing the first angle to the second angle to determine the relative orientation between the first and second ear cups.

Figure 8:
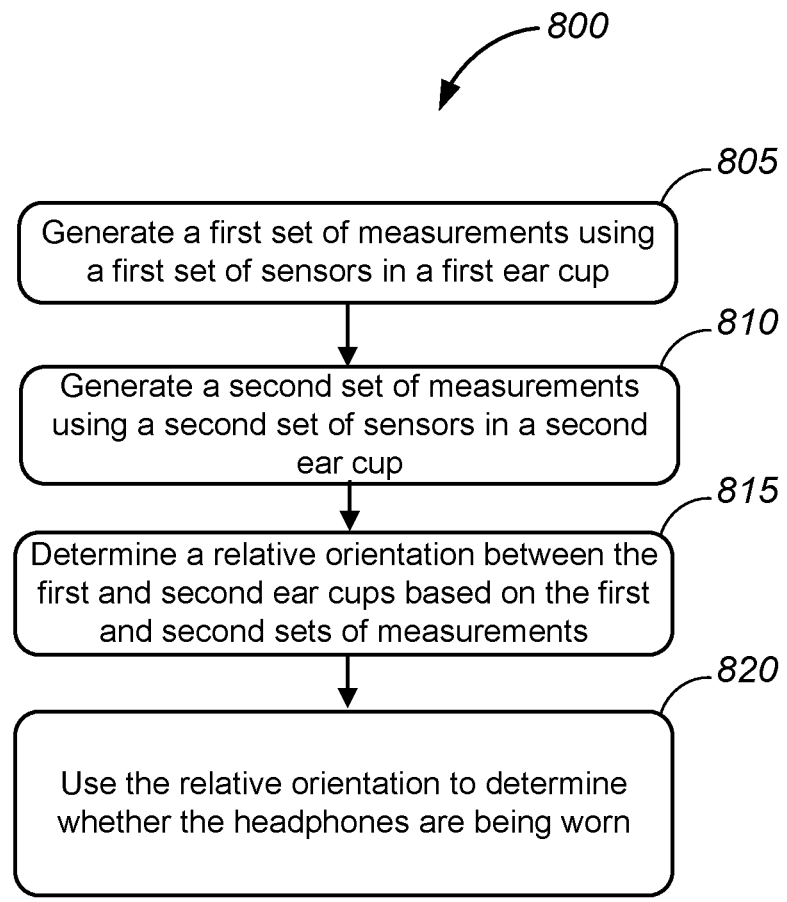
FIG. 8 shows another flowchart of a method for detecting orientation of a pair of headphones in accordance with some embodiments of the disclosure.

Reference is now made to FIG. 8, which depicts another flowchart 800 of a method for detecting orientation of a pair of headphones in accordance with some embodiments of the disclosure. At step 805, a first set of measurements are generated by a first set of sensors in a first ear cup of a pair of headphones. The first set of measurements may include a direction of the gravitational field and a direction of magnetic north with respect to the first ear cup. The first ear cup may further include a first speaker.

At step 810, a second set of measurements, which in some embodiments is taken concurrently with the first set of measurements in step 805, are generated by a second set of sensors in a second ear cup of a pair of headphones. The second set of measurements may include a direction of the gravitational field and a direction of magnetic north with respect to the second ear cup. The second ear cup may further include a second speaker. The first ear cup and the second ear cup may be interconnected by a headband of the headphones. In some embodiments, each of the first and second sets of sensors may include an accelerometer configured to measure a direction of the gravitational field and a magnetometer configured to measure a direction of magnetic north. In some embodiments, the magnetometer may be configured to measure vector components of a magnetic field. In some embodiments, the headphones may further include a strain gauge operatively coupled to the headphones to detect when the first and second ear cups are separated by more than a predetermined distance.

At step 815, a relative orientation between the first and second ear cups may be determined based on the first and second sets of measurements. At step 820, the relative orientation may be used to determine whether the headphones are being worn on a head of a user. For example, if the tilt of the first and second ear cups is between a predetermined range, e.g., 5° to 16°, it may be concluded that the headphones are being worn on the head of a user. If the tilt of the first and second ear cups it outside this predetermined range, it may be concluded that the headphones are not being worn on the head of the user.

Once it has been detected whether the headphones are on or off the head of a user, one or more actions may be implemented. For example, if the headphones are detected to be on the head of a user, the headphones may be automatically powered on. Conversely, if the headphones are detected to be off the head of a user, the headphones may be automatically powered off. In this example, the headphones may omit a power button and instead use automatic detection as described to power on and off. In another example, if the headphones are detected to be off the head of a user, the headphones may pause playback of an audio signal. If the headphones are detected to be transitioned onto the head of a user, the headphones may restart playback of an audio signal.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not taught to be exhaustive or to limit the embodiments to the precise forms disclosed. Many modifications and variations are possible in view of the above teachings.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined encoder-decoder (CODEC).

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A pair of headphones comprising:
   a first ear cup including a first speaker and a first set of sensors configured to generate a first set of measurements, the first set of measurements including a direction of a gravitational field and a direction of magnetic north with respect to the first ear cup;
   a second ear cup including a second speaker and a second set of sensors configured to generate a second set of measurements, the second set of measurements including a direction of the gravitational field and a direction of magnetic north with respect to the second ear cup;
   a headband extending between the first and second ear cups; and
   control circuitry coupled to the first and second sets of sensors and configured to determine a relative orientation between the first and second ear cups based on the first and second sets of measurements and use the relative orientation in determining whether to route a left or right channel audio signal to the first speaker.

2. The pair of headphones of claim 1 wherein each of the first and second sets of sensors includes an accelerometer configured to measure a direction of the gravitational field and a magnetometer configured to measure a direction of magnetic north.

3. The pair of headphones of claim 2 wherein each magnetometer is configured to measure vector components of a magnetic field.

4. The pair of headphones of claim 2 wherein each magnetometer is configured to output a magnetic field vector (x, y, z) reflecting the magnetic field incident on the magnetometer.

5. The pair of headphones of claim 4 wherein the control circuitry is further configured to derive yaw angle measurements from the magnetic field vector for each of the first and second ear cups.

6. The pair of headphones of claim 1 wherein the control circuitry is further configured to determine a yaw angle measurement between the first and second ear cups based on the first and second sets of measurements and wherein the determination of whether to route the left or right channel audio signal to the first speaker is based on the yaw angle measurement.

7. The pair of headphones of claim 1 further comprising:
   a strain gauge operatively coupled to the headband and configured to detect when the first and second ear cups are separated by more than a predetermined distance.

8. The pair of headphones of claim 1 wherein the control circuitry is further configured to, based on the first and second sets of measurements, route a left channel audio signal to one of the first or second ear cups and route the right channel audio signal to the other of the first or second ear cups.

9. The pair of headphones of claim 1 wherein determining the relative orientation between the first and second ear cups comprises measuring an angle between a first vector based on the direction of the gravitational field and the direction of magnetic north provided by the first set of sensors and a second vector based on the direction of the gravitational field and the direction of magnetic north provided by the second set of sensors.

10. The pair of headphones of claim 1 wherein the headphones are fully symmetric along a centerline that runs through the headband and through each of the first and second ear cups.

11. A pair of headphones comprising:
- a first ear cup including a first speaker, a first accelerometer configured to measure a direction of the gravitational field with respect to the first ear cup, and a first magnetometer configured to measure a direction of magnetic north with respect to the first ear cup;
- a second ear cup including a second speaker, a second accelerometer configured to measure a direction of the gravitational field with respect to the second ear cup, and a second magnetometer configured to measure a direction of magnetic north with respect to the second ear cup;
- a headband extending between the first and second ear cups; and
- control circuitry coupled to and configured to receive input from the first and second accelerometers and the first and second magnetometers and determine a relative orientation between the first and second ear cups based on the input and use the relative orientation in selecting which of the first or second speakers receives a left channel audio signal and which of the first or second speakers receives a right audio channel signal.

12. The pair of headphones of claim 11 wherein the control circuitry is configured to determine a first angle of the first ear cup relative to a user's head based on input from the first accelerometer and the first magnetometer, determine a second angle of the second ear cup relative to the user's head based on input from the second accelerometer and the second magnetometer, and compare the first angle to the second angle to determine the relative orientation between the first and second ear cups.

13. The pair of headphones of claim 11 wherein each magnetometer is configured to output a magnetic field vector (x, y, z) reflecting the magnetic field incident on the magnetometer.

14. The pair of headphones of claim 13 wherein the control circuitry is further configured to derive yaw angle measurements from the magnetic field vector for each of the first and second ear cups.

15. The pair of headphones of claim 11 wherein the control circuitry is configured to determine a tilt between the first and second ear cups based on the measurements made by the first and second magnetometers and the first and second accelerometers.

16. The pair of headphones of claim 11 further comprising:
- a strain gauge operatively coupled to the headband and configured to detect when the first and second ear cups are separated by more than a predetermined distance.

17. The pair of headphones of claim 11 wherein the control circuitry is further configured to, based measurements made by the first and second magnetometers and the first and second accelerometers, route a left channel audio signal to one of the first or second ear cups and route the right channel audio signal to the other of the first or second ear cups.

18. The pair of headphones of claim 11 wherein the first ear cup is identical in physical appearance to the second ear cup.

19. The pair of headphones of claim 11 wherein the headphones are fully symmetric along a centerline that runs through the headband and through each of the first and second ear cups.

20. A pair of headphones comprising:
- a first ear cup including a first speaker, a first accelerometer configured to measure a direction of the gravitational field with respect to the first ear cup, and a first magnetometer configured to measure a direction of magnetic north with respect to the first ear cup;
- a second ear cup including a second speaker, a second accelerometer configured to measure a direction of the gravitational field with respect to the second ear cup, and a second magnetometer configured to measure a direction of magnetic north with respect to the second ear cup;
- a headband extending between the first and second ear cups;
- wireless communication circuitry configured to receive media content, including a stereophonic audio signal that includes a left channel audio signal and a right channel audio signal, from an external source; and
- control circuitry coupled to and configured to receive input from the first and second accelerometers and the first and second magnetometers and determine a relative orientation between the first and second ear cups based on the input and use the relative orientation in selecting which of the first or second speakers to route the left channel audio signal and which of the first or second speakers to route the right audio channel signal.

* * * * *